United States Patent
Gubbi et al.

(10) Patent No.: US 6,574,668 B1
(45) Date of Patent: Jun. 3, 2003

(54) RETRANSMISSION SCHEME IN WIRELESS COMPUTER NETWORKS

(75) Inventors: Rajugopal R. Gubbi, Fair Oaks, CA (US); Donia Sebastian, Folsom, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/614,928

(22) Filed: Jul. 12, 2000

Related U.S. Application Data

(60) Provisional application No. 60/178,081, filed on Jan. 25, 2000.

(51) Int. Cl.$^7$ .............................................. G06F 15/16
(52) U.S. Cl. ...................................... 709/237; 709/231
(58) Field of Search ................................ 709/237, 243, 709/244, 245, 231, 232, 233, 236

(56) References Cited

U.S. PATENT DOCUMENTS

| | | | | |
|---|---|---|---|---|
| 5,555,266 A | * | 9/1996 | Buchholz et al. | 370/95.1 |
| 5,727,002 A | * | 3/1998 | Miller et al. | 371/132 |
| 6,049,549 A | * | 4/2000 | Ganz et al. | 370/449 |
| 6,151,696 A | * | 11/2000 | Miller et al. | 714/748 |
| 6,175,944 B1 | * | 1/2001 | Urbanke et al. | 714/776 |
| 6,189,122 B1 | * | 2/2001 | Cheng | 714/748 |
| 6,208,620 B1 | * | 3/2001 | Sen et al. | 370/231 |
| 6,229,621 B1 | * | 5/2001 | Kulkowski et al. | 358/1.15 |
| 6,240,460 B1 | * | 5/2001 | Mitsutake et al. | 709/235 |

* cited by examiner

*Primary Examiner*—Glenton B. Burgess
*Assistant Examiner*—Tod Kupstas
(74) *Attorney, Agent, or Firm*—James J. Murphy, Esq.; Winstead Sechrest & Minick, P.C.

(57) ABSTRACT

Data is transmitted over a computer network from a source network component to one or more destination network components. Thereafter, one or more acknowledgements are transmitted from one of the destination network components to the source network component; and different data, which may include retransmissions, from the previously transmitted data is transmitted from the source network component to the one or more destination network components. A negative acknowledgement message from the destination network component may be transmitted to the source network component upon a failure to receive one or more of the transmitted data packets, the negative acknowledgment including packet identifications of said one or more data packets. Then data packets identified by the identifications received in a negative acknowledgement may be retransmitted before transmitting other packets. The negative acknowledgements thus indicate failed receipt of data. Positive acknowledgements indicate successful receipt of data.

17 Claims, 3 Drawing Sheets

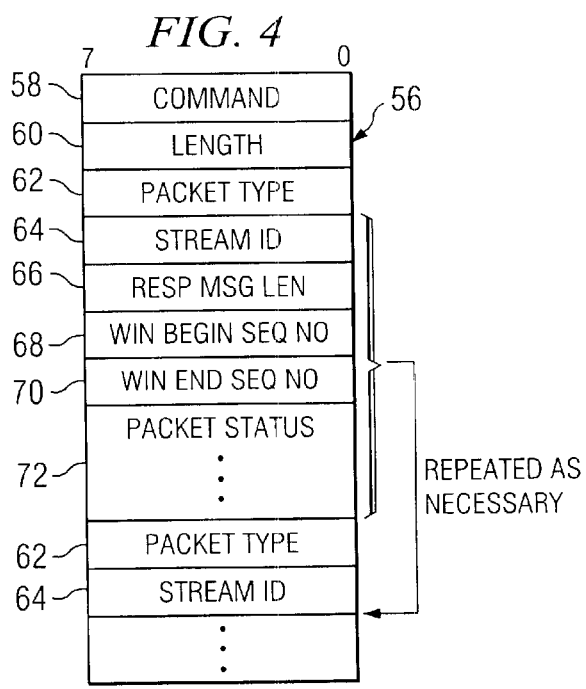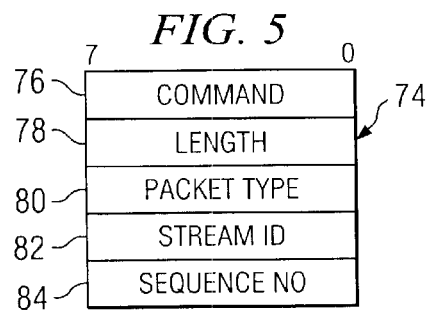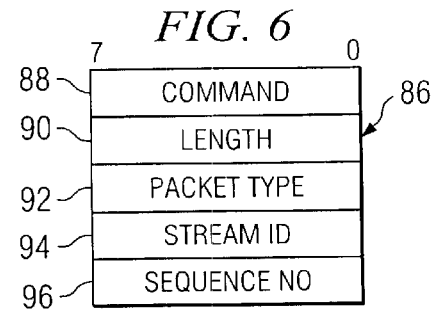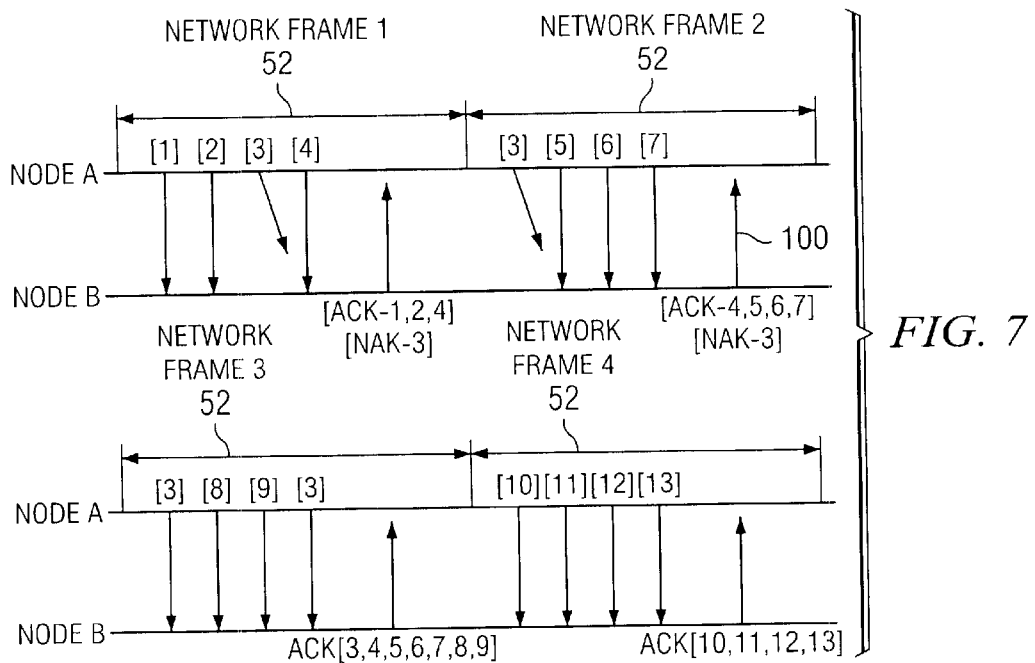

RETRANSMISSION SCHEME IN WIRELESS COMPUTER NETWORKS

RELATED APPLICATION

The present application is related to and hereby claims the priority benefit of US Provisional Application No. 60/178,081, entitled "Retransmission Scheme in Wireless Computer Networks" filed Jan. 25, 2000, by Rajugopal R. Gubbi and Donnia Sebastian.

FIELD OF THE INVENTION

The present invention relates generally to a scheme for communications within a computer network and, in particular, to such communications as occur between nodes in such a network across a wireless link.

BACKGROUND

Modern computer networks allow for intercommunication between a number of nodes such as personal computers, workstations, peripheral units and the like. Network links transport information between these nodes, which may sometimes be separated by large distances. However, to date most computer networks have relied on wired links to transport this information. Where wireless links are used, they have typically been components of a very large network, such as a wide area network, which may employ satellite communication links to interconnect network nodes separated by very large distances. In such cases, the transmission protocols used across the wireless links have generally been established by the service entities carrying the data being transmitted, for example, telephone companies and other service providers.

In the home environment, computers have traditionally been used as stand-alone devices. More recently, however, there have been some steps taken to integrate the home computer with other appliances. For example, in so-called "Smart Homes", computers may be used to turn on and off various appliances and to control their operational settings. In such systems, wired communication links are used to interconnect the computer to the appliances that it will control. Such wired links are expensive to install, especially where they are added after the original construction of the home.

In an effort to reduce the difficulties and costs associated with wired communication links, some systems for interconnecting computers with appliances have utilized analog wireless links for transporting information between these units. Such analog wireless links operate at frequencies commonly utilized by wireless telephones. Although easier to install than conventional wired communication links, analog wireless communication links suffer from a number of disadvantages. For example, degraded signals may be expected on such links because of multipath interference. Further, interference from existing appliances, such as televisions, cellular telephones, wireless telephones and the like, may be experienced. Thus, analog wireless communication links offer less than optimum performance for a home environment.

In a co-pending application, Ser. No. 09/151,579, which is assigned to the assignee of the present application and is incorporated herein by reference, a computer network employing a digital wireless communication link adapted for use in the home and other environments was described. The architecture of that network (referred to in the previously cited provisional application as a "Whitecap" network) included a number of network components arranged in a hierarchical fashion and communicatively coupled to one another through communication links operative at different levels of the hierarchy. At the highest level of the hierarchy, a communication protocol that supports dynamic addition of new network components at any level of the hierarchy according to bandwidth requirements within a communication channel operative at the highest level of the network hierarchy is used.

The generalization of this network structure is shown in FIG. 1. A subnet 10 includes a server 12. In this scheme, the term "subnet" is used to describe a cluster of network components that includes a server and several clients associated therewith (e.g., coupled through the wireless communication link). Depending on the context of the discussion however, a subnet may also refer to a network that includes a client and one or more subclients associated therewith. A "client" is a network node linked to the server through the wireless communication link. Examples of clients include audio/video equipment such as televisions, stereo components, personal computers, satellite television receivers, cable television distribution nodes, and other household appliances.

Server 12 may be a separate computer that controls the communication link, however, in other cases server 12 may be embodied as an add-on card or other component attached to a host computer (e.g., a personal computer) 13. Server 12 has an associated radio 14, which is used to couple server 12 wirelessly to the other nodes of subnet 10. The wireless link generally supports both high and low bandwidth data channels and a command channel. Here a channel is defined as the combination of a transmission frequency (more properly a transmission frequency band) and a pseudo-random (PN) code used in a spread spectrum communication scheme. In general, a number of available frequencies and PN codes may provide a number of available channels within subnet 10. As is described in the co-pending application cited above, servers and clients are capable of searching through the available channels to find a desirable channel over which to communicate with one another.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. Subclients 20 may include keyboards, joysticks, remote control devices, multi-dimensional input devices, cursor control devices, display units and/or other input and/or output devices associated with a particular client 16. A client 16 and its associated subclients 20 may communicate with one another via communication links 21, which may be wireless (e.g., infra-red, ultrasonic, spread spectrum, etc.) communication links.

Each subnet 10 is arranged in a hierarchical fashion with various levels of the hierarchy corresponding to levels at which intra-network component communication occurs. At a highest level of the hierarchy exists the server 12 (and/or its associated host 13), which communicates with various clients 16 via the wireless radio channel. At other, lower levels of the hierarchy the clients 16 communicate with their various subclients 20 using communication links 21, for example, wired communication links or wireless communication links such as infrared links.

Where half-duplex radio communication is used on the wireless link between server 12 and clients 16, a communication protocol based on a slotted link structure with dynamic slot assignment is employed. Such a structure supports point-to-point connections within subnet 10 and slot sizes may be re-negotiated within a session. Thus a data link layer that supports the wireless communication can accommodate data packet handling, time management for packet transmission and slot synchronization, error correction coding (ECC), channel parameter measurement and channel switching. A higher level transport layer provides all necessary connection related services, policing for bandwidth utilization, low bandwidth data handling, data broadcast and, optionally, data encryption. The transport layer also allocates bandwidth to each client 16, continuously polices any under or over utilization of that bandwidth, and also accommodates any bandwidth renegotiations, as may be required whenever a new client 16 comes on-line or when one of the clients 16 (or an associated subclient 20) requires greater bandwidth.

The slotted link structure of the wireless communication protocol for the transmission of real time, multimedia data (e.g., as frames) within a subnet 10 is shown in FIG. 2. At the highest level within a channel, forward (F) and backward or reverse (B) slots of fixed (but negotiable) time duration are provided within each frame transmission period. During forward time slots F, server 12 may transmit video and/or audio data and/or commands to clients 16, which are placed in a listening mode. During reverse time slots B, server 12 listens to transmissions from the clients 16. Such transmissions may include audio, video or other data and/or commands from a client 16 or an associated subclient 20. At the second level of the hierarchy, each transmission slot (forward or reverse) is made up of one or more radio data frames 40 of variable length. Finally, at the lowest level of the hierarchy, each radio data frame 40 is comprised of server/client data packets 42, which may be of variable length.

Each radio data frame 40 is made up of one server/client data packet 42 and its associated error correction coding (ECC) bits. Variable length framing is preferred over constant length framing in order to allow smaller frame lengths during severe channel conditions and vice-versa. This adds to channel robustness and bandwidth savings. Although variable length frames may be used, however, the ECC block lengths are preferably fixed. Hence, whenever the data packet length is less than the ECC block length, the ECC block may be truncated (e.g., using conventional virtual zero techniques). Similar procedures may be adopted for the last block of ECC bits when the data packet is larger.

As shown in the illustration, each radio, data frame 40 includes a preamble 44, which is used to synchronize pseudo-random (PN) generators of the transmitter and the receiver. Link ID 46 is a field of fixed length (e.g., 16 bits long for one embodiment), and is unique to the link, thus identifying a particular subnet 10. Data from the server 12/client 16 is of variable length as indicated by a length field 48. Cyclic redundancy check (CRC) bits 50 may be used for error detection/correction in the conventional fashion.

For the illustrated embodiment then, each frame 52 is divided into a forward slot F, a backward slot B, a quiet slot Q and a number of radio turn around slots T. Slot F is meant for server 12-to-clients 16 communication. Slot B is time shared among a number of minislots $B_1$, $B_2$, etc., which are assigned by server 12 to the individual clients 16 for their respective transmissions to the server 12. Each mini-slot $B_1$, $B_2$, etc. includes a time for transmitting audio, video, voice, lossy data (i.e., data that may be encoded/decoded using lossy techniques or that can tolerate the loss of some packets during transmission/reception), lossless data (i.e., data that is encoded/decoded using lossless techniques or that cannot tolerate the loss of any packets during transmission/reception), low bandwidth data and/or command (Cmd.) packets. Slot Q is left quiet so that a new client may insert a request packet when the new client seeks to login to the subnet 10. Slots T appear between any change from transmit to receive and vice-versa, and are meant to accommodate individual radios' turn around time (i.e., the time when a half-duplex radio 14 switches from transmit to receive operation or vice-versa). The time duration of each of these slots and mini-slots may be dynamically altered through renegotiations between the server 12 and the clients 16 so as to achieve the best possible bandwidth utilization for the channel. Note that where full duplex radios are employed, each directional slot (i.e., F and B) may be full-time in one direction, with no radio turn around slots required.

Forward and backward bandwidth allocation depends on the data handled by the clients 16. If a client 16 is a video consumer, for example a television, then a large forward bandwidth is allocated for that client. Similarly if a client 16 is a video generator, for example a video camcorder, then a large reverse bandwidth is allocated to that particular client. The server 12 maintains a dynamic table (e.g., in memory at server 12 or host 13), which includes forward and backward bandwidth requirements of all on-line clients 16. This information may be used when determining whether a new connection may be granted to a new client. For example, if a new client 16 requires more than the available bandwidth in either direction, server 12 may reject the connection request. The bandwidth requirement (or allocation) information may also be used in deciding how many radio packets a particular client 16 needs to wait before starting to transmit its packets to the server 12. Additionally, whenever the channel conditions change, it is possible to increase/reduce the number of ECC bits to cope with the new channel conditions. Hence, depending on whether the information rate at the source is altered, it may require a dynamic change to the forward and backward bandwidth allocation.

Within any computer network environment, and particularly within wireless networks, packets that are transmitted by one node may be lost before being properly received by the intended receiving node. The reasons for such losses may vary from one network to another, but in general may be due to the use of lossy communications protocols, lossy transmission mediums, interference from other transmission sources, overflows at the receiving node, or other reasons. Thus, a retransmission scheme is needed to allow for retransmissions of data that may have been lost sometime after being transmitted by the transmitting node.

SUMMARY OF THE INVENTION

In one embodiment, data is transmitted over a computer network from a source network component to one or more destination network components. Thereafter, one or more acknowledgements are transmitted from one of the destination network components to the source network component; and different data from the previously transmitted data is transmitted from the source network component to the one or more destination network components upon a failure to receive said one or more acknowledgements from said one of the destination network component. The previously transmitted data may be retransmitted from the source network component to one or more destination network components upon a failure to receive said one or more acknowledgements from said destination network component and upon expiration of a specified timeout period.

Further, network frames may be transmitted over a computer network from a source network component to one or more destination network components, the frames including one or more sequentially identified packets of data. A negative acknowledgement message from a destination network component may be transmitted to the source network component upon a failure to receive one or more of the transmitted data packets, the acknowledgment including packet identifications of said one or more data packets. Then data packets identified by the identifications received in a negative acknowledgement may be retransmitted before transmitting other packets. The negative acknowledgements thus indicate failed receipt of data. Positive acknowledgements indicate successful receipt of data.

In some embodiments, a portion of bandwidth may be reserved through negotiations between source and destination network components for each data stream transmitted. Data may be transmitted as sequentially identified packets within a network frame and the number of packets transmitted within a network frame may be dynamically negotiated for each data stream transmitted between two network components. Any acknowledgements may include the packet identifications of such data packets.

In some embodiments the source network component maintains an index of sequential packets available for retransmission. The retransmission index dynamically spans from the last non-acknowledged packet to the last transmitted packet in the sequence.

In some embodiments the number of times a packet is retransmitted before being dropped it is dynamically negotiated for each stream of data transmitted between two or more network components. Any packets with identifications included in a negative acknowledgement are preferably retransmitted at least once before transmitting any other packets within a network frame.

A further embodiment provides an interface communicatively coupling a system with a computer network. The interface includes means for transmitting data over a computer network from a source network component to one or more destination network components; means for transmitting one or more acknowledgements from a destination network component to the source network component; and means for transmitting different data from the previously transmitted data from the source network component to one or more destination network components upon failure to receive said one or more acknowledgements from said destination network component.

A further embodiment provides a system communicatively coupled with a computer network. The system may include means for transmitting data over a computer network from a source network component to one or more destination network components; means for transmitting one or more acknowledgements from a destination network component to the source network component; and means for transmitting different data from the previously transmitted data from the source network component to one or more destination network components upon failure to receive said one or more acknowledgements from said destination network component.

In still further embodiments, a modulated signal embodying one or more computer-readable symbols, which when organized in a computer platform, allow said platform to acknowledge reception of stream data in accordance therewith. Such symbols contain one or more of the following fields: a packet type, a stream ID, the length of acknowledgement message, a beginning sequence number, an ending sequence number, and the status of each packet between the beginning sequence number and the ending sequence number. In other cases, such symbols might contain one or more of the following: a packet type, a stream ID, and a packet sequence number; or a packet type, a stream ID, and a starting packet sequence number.

These and other features and advantages of the present invention will be apparent from a review of the detailed description and its accompanying drawings that follow.

BRIEF DESCRIPTION OF THE DRAWINGS

The present invention is illustrated by way of example, and not limitation, in the figures of the accompanying drawings in which:

FIG. 4 illustrates a Stream_Retx_Cmd packet for use with the present retransmission scheme according to one embodiment of the present invention;

FIG. 5 illustrates a Stream_Discard_Cmd packet for use with the present retransmission scheme in accordance with one embodiment of the present invention;

FIG. 6 illustrates a Stream_Seqno_Sync_Cmd packet for use with the present retransmission scheme in accordance with one embodiment of the present invention;

FIG. 7 illustrates acknowledgement window formation and sliding mechanisms of the present retransmission scheme in accordance with one embodiment of the present invention.

DETAILED DESCRIPTION

Described herein is scheme for retransmitting data and/or commands within a wireless computer network. The present scheme is generally applicable to a variety of wireless network environments, but finds especially useful application in a computer network which is located in a home environment. Thus, in some cases the present scheme may be discussed with reference to the particular aspects of a home environment. However, this discussion should in no way be seen to limit the applicability of the present invention to other network environments and the broader spirit and scope of the present invention is recited in the claims which follow this discussion.

Figure 2:
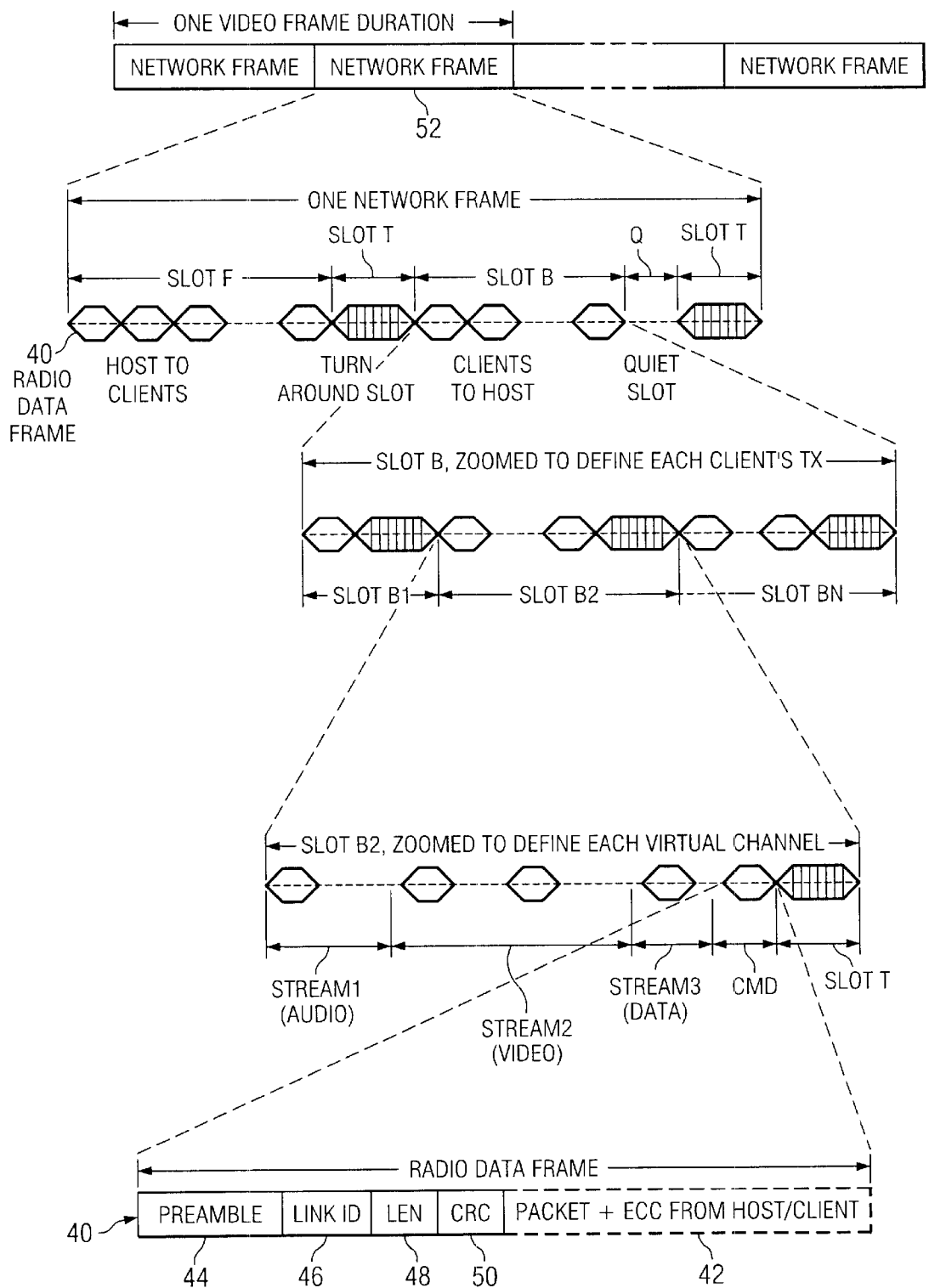
FIG. 2 illustrates a hierarchical arrangement for the transmission of data and control information within a subnet according to one embodiment of the present invention.

In one embodiment, the present retransmission scheme is used within a wireless computer network wherein half-duplex radio communication is used according to a slotted link structure with dynamic slot assignment (e.g., as shown in FIG. 2 and described above). Such a structure will support point-to-point connections within subnet 10 and slot sizes may be re-negotiable within a session. Packets 42 transmitted across the wireless link may generally have three main parts: a header, a variable length payload and an ECC block.

For command packets, the payload field may generally contain one or more commands, each followed by related data bytes, and/or low bandwidth data from subclients 20. Various commands supported in each direction of communication across the wireless link are discussed below. Unless otherwise stated, acknowledgment messages (ACK) are generally expected to be returned by a receiving node for any packets sent from a transmitting node across the wireless communication link.

Figure 1:
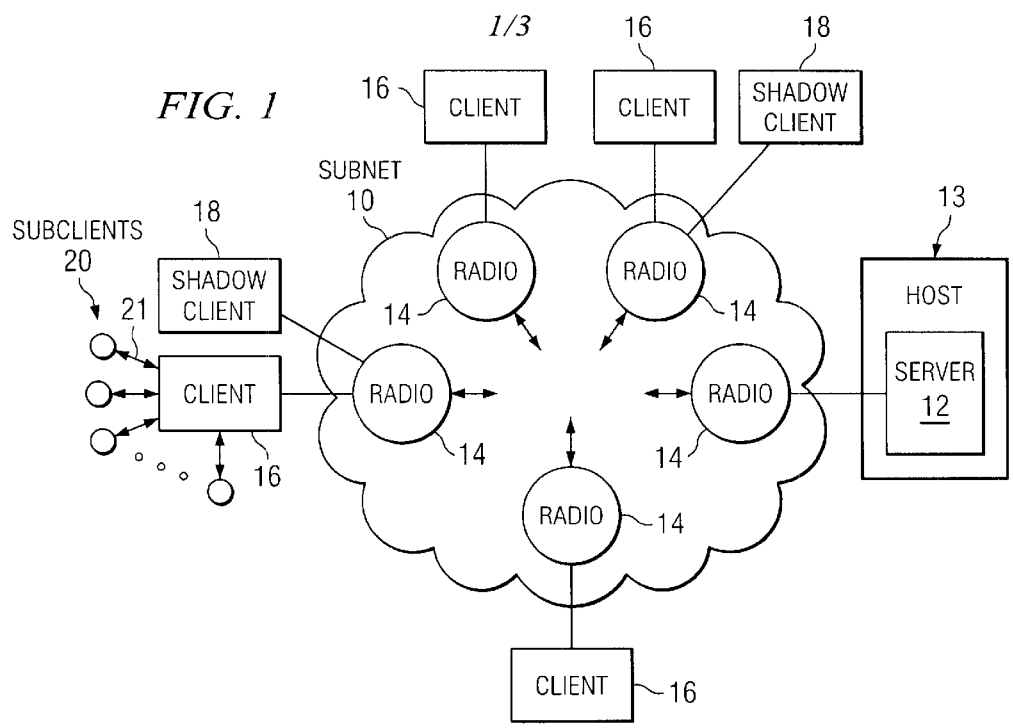
FIG. 1 illustrates a generalized network structure that is supported by a wireless communication protocol configured in accordance with an embodiment of the present invention.
Figure 3:
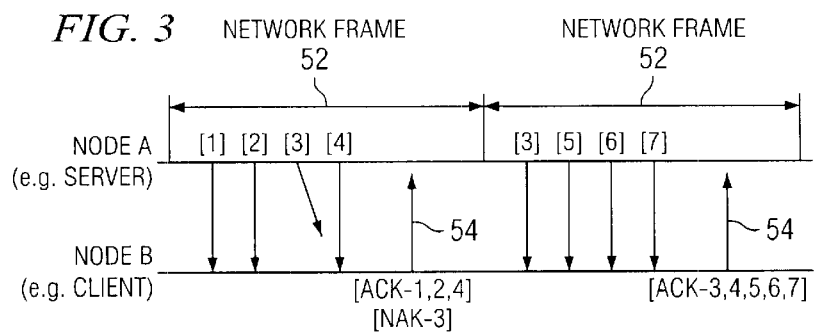
FIG. 3 illustrates a retransmission scheme employing grouped positive and negative acknowledgements for use in a computer network in accordance with one embodiment of the present invention.

The present retransmission mechanism is styled as a continuous ARQ scheme with a selective repeat function, as illustrated in FIG. 3. As shown, within a network frame 52, various packets (designated by the use of numbers within square brackets in the illustration) may be transmitted from one node to another (e.g., from a server to a client) across the wireless link. The acknowledgements (ACK) 54 returned by the receiving node are grouped and transmitted, preferably as a command packet, in that node's transmission slot (e.g., its respective B mini-slot) in the network frame. Included in that grouping are positive acknowledgements (ACKs) and negative acknowledgements (NAKs). The negative acknowledgements are an indication that a packet was not received (e.g., packet 3 in the first network frame as shown in the illustration). The source node then retransmits the negatively acknowledged packets along with any new packets in the succeeding network frame 52. In one embodiment, such retransmitted packets are always sent before any new packets are sent.

In addition to the use of the continuous ARQ with selective repeat, the present retransmission scheme also provides for multiple retransmissions per request, when channel bandwidth is available, and, as shown in FIG. 3, employs a grouped, window based acknowledgement mechanism.

To accommodate the use of the positive and negative acknowledgements discussed above, the transmitting node (node A in FIG. 3) stamps each packet in a stream with a sequence number. This way, the receiving node is able to responds with a positive/negative acknowledgement for a given packet. The acknowledgements are grouped to synchronize with the node's transmit slot and are transmitted as part of a command stream. For the example in FIG. 3, node A is transmitting packets to node B. The packet with sequence number 3 is lost in the first network frame 52 and hence is negatively acknowledged by node B. Accordingly, in the second network frame 52, node A retransmits packet [3] and then transmits new packets.

As indicated above, the retransmission mechanism uses command packets to communicate acknowledgement information between nodes. Examples of such messages that may be relayed between the nodes follow.

STREAM_RETX_CMD

The Stream Retransmission Command packet 56, shown in FIG. 4, is an acknowledgement sent by a receiving node indicating the status of the packets received. The acknowledgement window preferably spans the period from the last acknowledged packet to the last received packet. Situations where deviations from this scheme may be used are explained below. A single command packet to a node can contain the acknowledgements for all streams to that node. The format of the command packet includes one or more fields as follows:

COMMAND (58)—Set to STREAM_RETX_CMD.

LENGTH (60)—The length of the command packet payload

PACKET TYPE (62), STREAM ID (64)—Together these fields identify the specific stream for which the acknowledgement is being sent.

RESP MSG LEN (66)—The length of the acknowledgement message for this stream, in bytes.

WIN BEGIN SEQ NO (68)—Beginning Sequence Number of the stream's acknowledgement window.

WIN END SEQ NO (70)—Ending Sequence Number of the stream's acknowledgement window.

PACKET_STATUS (72)—Bitmap indicating the status of received packets from WIN BEGIN SEQ NO to WIN END SEQ NO. In one embodiment, a bit value of '0' indicates a positive ACK and a '1' indicates a NAK. The length of this field varies depending on the acknowledgement window size and is indicated by RESP MSG LEN (66).

STREAM_DISCARD_CMD

The Stream Discard Command 74, shown in FIG. 5, is a command packet sent by a transmitting node and instructs the receiving node to ignore the packet with the specified sequence number. In situations where the transmitting node fails to receive a positive acknowledgement from the receiver and the maximum tolerable delay for the stream has expired, such messages may be used. The packet 74 includes the following fields:

COMMAND (76)—Set to STREAM_DISCARD_CMD.

LENGTH (78)—The length of the command packet payload

PACKET TYPE (80), STREAM ID (82)—Together these values identify the specific stream for which the discard command is being sent.

SEQUENCE NO—The sequence number of packet to be discarded in the stream.

STREAM_SEQNO_SYNC_CMD

The Stream Sequence Number Synchronization Command 86, shown in FIG. 6, may be sent by a transmitting node to synchronize sequence numbers with a receiving node. On receiving this command, the receiving node should update its state for the stream to expect the identified sequence number in the command packet 86 next. Fields of this packet include:

COMMAND (88)—Set to STREAM_SEQNO_SYNC_CMD.

LENGTH (90)—The length of the command packet payload

PACKET TYPE (92), STREAM ID (94)—Together these fields identify the specific stream for which the command is being sent.

SEQUENCE NO (96)—The starting sequence number to be expected.

FIG. 7 further illustrates the acknowledgement window formation and sliding mechanisms of the present retransmission scheme. In each case, node A is a transmitting node and node B is a receiving node. Consider then the following various scenarios:

1) Acknowledgement Window Spanning

The acknowledgement window should always include the status of all packets received since the last acknowledgement. If there were lost packets detected previously, the window spans the period from the first negatively acknowledged packet to the last received packet. This is illustrated in FIG. 7, where, in network frame 2, node B's acknowledgement window for the grouping 100 spans from packet [3] (the first negatively acknowledged packet of the preceding frame) to packet [7] (the last received packet). Notice that in this example, the retransmitted packet [3] was lost a second time. Thus, the acknowledgement window must still include information regarding packet [3], with a negative acknowledgement therefor.

2) Voluntary Repeats in a Network Frame

The transmitting node may choose to repeat the lost packet retransmission, if there are no new packets to be transmitted and channel bandwidth is available. In the above example, in network frame 3, node A repeats the retransmission of packet [3] after sending new packets [8, 9], as bandwidth is available to send one more packet and no new packets were present.

The maximum window size for such voluntary retransmissions depends on the number of buffers available and the delay and throughput requirements for the stream. This may negotiated and determined between the nodes during the stream connection setup. When the maximum window size is reached, the transmitting node should stop transmitting new packets and retransmit lost packets. The receiving node should have sufficient buffer capacity to queue all the received packets until the lost packets are received. Note that a small window size could negatively affect the throughput of the stream. If a stream has stringent delay requirements (say two network frames), then the window size can be kept small and the transmitting node can resort to voluntary repetitions of lost packets to reduce delay.

The maximum number of retransmissions is dependent upon the maximum tolerable delay and can be configured based on the packet stream—Audio/Video/Data. For example, if the stream traffic has a higher layer retransmission mechanism, say as in the case of TCP/IP data, the maximum delay should not exceed the TCP timeout period. For such streams, if a packet has not been successfully delivered within the tolerable delay period, the transmitting node can stop retransmission and instruct the receiving node to ignore the lost packet (e.g., using the STREAM_DISCARD_CMD) and move on.

3) No Acknowledgement Received

If the transmitting node does not receive any response from the receiving node before its next transmit slot (e.g., as could happen if the acknowledgement packet sent by the receiving node is lost), no retransmissions are sent in the next transmit slot. The assumption here is that all the packets sent in the previous slot have been received, however the transmitting node's transmit buffers should be freed up only based on the next acknowledgement packet from receiving node.

Figure 8:
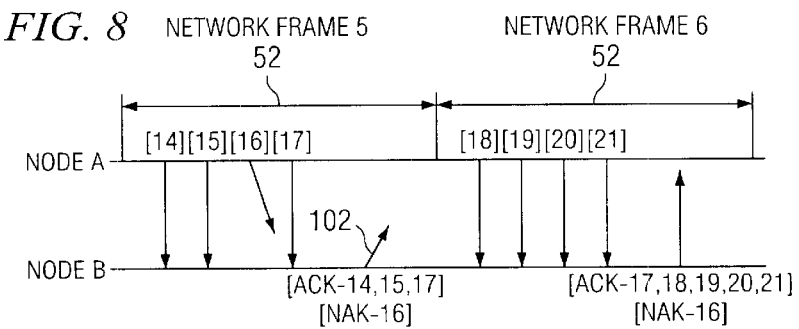
FIG. 8 illustrates an example of the present retransmission scheme wherein acknowledgement messages are lost during transmission and the transmitting node operates in accordance with one embodiment of the present invention.

FIG. 8 illustrates an example of such a situation. The acknowledgement packet 102 sent by node B in network frame 5 is lost and does not reach node A. So, in network frame 6, node A transmits only new packets [18,19,20,21] even though a prior packet ([16]) was lost in network frame 5. When it receives the acknowledgement in network frame 6, node A realizes that packet [16] was lost. Packet [16] therefore gets queued for retransmission in the next network frame (not shown) and all other packets are released.

4) Round Trip Delay More Than a Network Frame

If the round trip delay between nodes is longer than a network frame, the transmitting node will not receive acknowledgements for packets sent in the same network frame. In such cases, the transmitting node proceeds to transmit new packets in the next network frame and responds to acknowledgements as and when they arrive. This situation is similar to the one described above with reference to FIG. 8. The window size should be long enough to accommodate all the packets in pipeline.

5) Timeouts

If no acknowledgements are received from the receiving node within a specified timeout period, the transmitting node can decide to either retransmit the packets or discard the packets and proceed ahead. This decision is again based on the maximum tolerable delay for the stream.

6) Receive Buffer Overflow

The receive node may also decide to ignore the lost packets if it runs out of buffer space. This situation may arise when a STREAM_DISCARD_CMD sent by the transmitting node is lost. If this occurs, all the enqueued packets will be delivered to the higher layer and the next acknowledgement window updated.

Thus, a retransmission scheme for use in a wireless computer network has been described. Although discussed with reference to certain illustrated embodiments, the present invention should not be limited thereby. Instead, the present invention should only be measured in terms of the claims that follow.

What is claimed is:

1. A method of retransmission of data in computer networks comprising:

transmitting a first group of data packets from a plurality of data packets, over a computer network from a source network component, to one or more destination network components, wherein the data is transmitted as sequentially identified packets within a network frame;

transmitting one or more acknowledgements from a destination network component to the source network component, the acknowledgements comprising:

positive acknowledgements transmitted upon successful receipt of one or more of the transmitted data packets and including the packet identifications of said one or more successfully received data packets, and sequential identifications of all successfully received data packets from the first negatively acknowledged packet in the last negative acknowledgement to the last successfully received packet; and negative acknowledgements transmitted upon failed receipt of one or more of the transmitted data packets, the acknowledgments including the packet identifications of said one or more data packets that failed reception; and transmitting a second group of data packets comprised of previously transmitted data, which includes one or more of the first group of data packets, and newly transmitted data, which includes one or more new data packets from the plurality of data packets, from the source network component to one or more destination network components upon failure to receive said one or more acknowledgements from said destination network component.

2. The method of claim 1 wherein the one or more of the first group of packets transmitted in the second group of packets comprises previously transmitted data for which a positive acknowledgement has not been received prior to the expiration of a specified timeout period.

3. The method of claim 1 wherein a portion of bandwidth is reserved through negotiations between source and destination network components for each data stream transmitted.

4. The method of claim 1 wherein said acknowledgements comprise a window of packets and the status of receipt of each of the packets within the window.

5. The method of claim 4 wherein the window of packets comprises a sequence number of the earliest packet that has not been received.

6. The method of claim 5 wherein the window further comprises a sequence number of the most recent packet that has been received correctly.

7. The method of claim 6 wherein the number of packets transmitted within a network frame can be dynamically negotiated for each data stream transmitted between two network components.

8. The method of claim 4 wherein the status of the packets in the window is indicated by a bit map.

9. The method of claim 8 wherein the positive acknowledgements are indicated in the bitmap by a bit of a first value and the negative acknowledgments are indicated by bit of a second value.

10. The method of claim 9 wherein the source network component re-transmits the packets with identifications included in the negative acknowledgement.

11. The method of claim 10 wherein the source network component maintains an index window of sequential packets available for retransmission.

12. The method of claim 11 wherein the retransmission index window dynamically spans from the last non-acknowledged packet to the last transmitted packet in the sequence.

13. The method of claim 1 wherein the packets to be retransmitted are transmitted before any new packets.

14. The method of claim 13 wherein the number of times a packet is retransmitted before dropping it is dynamically negotiated for each stream of data transmitted between two or more network components.

15. The method of claim 13 wherein one or more of the packets are re-transmitted one or more times within a one network frame.

16. The method of claim 13 wherein all of the packets to be re-transmitted are transmitted at least once before transmitting any new packets within a network frame.

17. The method of claim 1 further comprising a modulated signal embodying one or more computer-readable symbols, which when organized in a computer platform, allow said platform to acknowledge reception of stream data in accordance therewith, said symbols containing one or more of the following fields:

a packet type, a stream ID, the length of acknowledgement message, a beginning sequence number, an ending sequence number, and the status of each packet between the beginning sequence number and the ending sequence number.

* * * * *